(12) United States Patent  
Imai

(10) Patent No.: US 7,914,008 B2
(45) Date of Patent: Mar. 29, 2011

(54) METAL GASKET AND MIS-ASSEMBLY DETECTION METHOD OF METAL GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 560 days.

(21) Appl. No.: 12/003,979

(22) Filed: Jan. 4, 2008

(65) Prior Publication Data

US 2008/0164661 A1 Jul. 10, 2008

(30) Foreign Application Priority Data

Jan. 5, 2007 (JP) ................................ 2007-000575

(51) Int. Cl.
*F16J 15/08* (2006.01)
(52) U.S. Cl. ........................................ 277/598; 277/313
(58) Field of Classification Search .................. 277/312, 277/313, 590, 591, 598
See application file for complete search history.

(56) References Cited

U.S. PATENT DOCUMENTS

| 4,217,384 | A | * | 8/1980 | Schnug .......................... 428/138 |
| 4,648,607 | A | * | 3/1987 | Yamada et al. ................ 277/598 |
| 5,210,943 | A | * | 5/1993 | Berkun et al. ................. 29/888.3 |
| 5,281,464 | A | * | 1/1994 | Sekioka et al. ................ 277/630 |
| 5,806,857 | A | * | 9/1998 | Mockenhaupt et al. ....... 277/595 |
| 6,409,178 | B1 | * | 6/2002 | Raden et al. ................... 277/592 |

FOREIGN PATENT DOCUMENTS

| JP | S62-159866 | 7/1987 |
| JP | U S62-114270 | 7/1987 |
| JP | U H01-165857 | 11/1989 |
| JP | U H06-085963 | 12/1994 |

* cited by examiner

*Primary Examiner* — Shane Bomar
*Assistant Examiner* — Gilbert Y Lee
(74) *Attorney, Agent, or Firm* — Manabu Kanesaka

(57) ABSTRACT

A metal gasket includes at least three metal plates including first, second and third metal plates laminated in this order from a top to form the metal gasket. Identification marks are provided on at least second and third metal plates in a position not to overlap with one another, and penetration windows are formed in at least the first and second metal plates. The penetration windows are arranged to see the identification mark therethrough located lower than the metal plate where the penetration window is formed.

12 Claims, 4 Drawing Sheets

US 7,914,008 B2

METAL GASKET AND MIS-ASSEMBLY DETECTION METHOD OF METAL GASKET

BACKGROUND OF THE INVENTION AND RELATED ART STATEMENT

The present invention relates to a metal gasket which can prevent mis-assembly or wrong assembly of a metal gasket formed by laminating three or more sheets of metal plates, held between two members for sealing; and a mis-assembly detection method of a metal gasket which only requires a simple device and can be easily automatically made.

For an automobile engine, metal gaskets such as a gasket sealing a simple sealing-target hole at an intake manifold or exhaust manifold and so on, or a cylinder head gasket sealing between a cylinder head and a cylinder block, are used. The above-mentioned metal gaskets are manufactured by laminating multiple metal plates with different materials, thicknesses, or processes, and in order to obtain a desired sealing capability, these multiple metal plates are required to be laminated in a correct direction on a correct side in a correct order.

However, in many cases, the shapes of the metal plates have roughly the same configuration, so that it is difficult to determine the direction, front or back sides, or the assembly sequence of the lamination of the metal plates. In such a case, when the metal plates are laminated, the direction, front and back sides, and assembly sequence of the lamination may be easily mistaken.

In order to solve the above-mentioned problem, proposals were made for mis-assembly discriminatory structure of a metal laminate gasket wherein at least a part of one surface of each structural plate is placed in order in a staircase pattern and exposed to the outside, or wherein at least a part of one surface of each structural plate is exposed to the outside so as not to overlap with one another during assembly (for example, refer to Japanese Utility Model Publication (JIKKAI) No. S62-114270 and Japanese Patent Publication (TOKKAI) No. S62-159866), so that the assembly sequence, that is, the number of the assembly order of each single structural plate of the laminated metal gasket can be clearly recognized.

Also, a cylinder head laminate gasket was proposed wherein at least one sheet of matching plate overlaps a sheet material; a mark showing the thickness of the sheet material is provided in a position displaced to one side from the center of a bore of the sheet material; and a notch is provided in a position corresponding to the mark in the matching plate. Also, a laminate metal gasket was proposed, wherein each metal plate forming the gasket includes a notch, engraved mark, marking and the like for recognizing the number of the assembly sequence of each metal plate. (For example, refer to Japanese Utility Model Publications (JIKKAI.) No. H1-165857 and No. H6-85963)

However, even with the structure which is visually recognizable as mentioned above, the gasket is assembled by determining a projection or groove of the laminated gasket, so that an irregularity of a minute part of the laminate plate with a similar color has to be recognized. Accordingly, human error cannot be completely prevented when the projection or groove is determined. Moreover, a device for preventing mis-assembly is required.

The invention is made in order to solve the problems described above, and an object of the present invention is to provide a metal gasket which is formed by laminating multiple metal plates, and can be easily recognized by an assembler or observer when the assembly sequence of the lamination of the metal plates is incorrect.

A further object of the present invention is to provide a mis-assembly detection method of the metal gasket which requires only a simple device and can be easily automated.

Further objects and advantages of the invention will be apparent from the following description of the invention.

SUMMARY OF THE INVENTION

In order to achieve the object described above, a metal gasket which is formed by laminating three or more metal plates and held between two members for sealing a sealing-target hole, is provided. An identification mark in each metal plate is provided so that each identification mark does not overlap with one another. A penetration window is provided in each metal plate except for the bottom layer of the metal plates. The penetration window can see through the identification mark of all the metal plates on the lower side during assembly, but cannot see through the identification mark of all the metal plates on the upper side.

The upper side, top layer, lower side, and bottom layer tentatively indicate a lamination direction, and do not necessarily mean a vertical direction in the installation state. Also, with respect to the lamination direction, when the vertical direction is reversed, this invention includes a case with the above-mentioned structure.

In the metal gasket, if the identification mark is not provided on the top layer of the metal plates, and only the penetration window is provided, the number of identification marks is reduced. Therefore, the manufacturing time can be reduced and the discrimination becomes easier. On the other hand, if the identification mark is provided on the top layer of the metal plates, the manufacturing time increases. However, the number of laminated plates and the number of identification marks correspond with each other, so that the assembly becomes easier to understand.

The identification mark can be formed by an engraved mark, coating, or pasting such as sealing. However, if the identification mark is punctured, it can be simultaneously manufactured with the penetration window, so that the manufacturing process can be reduced. If the identification mark is provided only on the side wherein the penetration window is placed during the assembly, the front and back sides of the metal plate can also be recognized.

In order to achieve the object described above, a mis-assembly detection method of the metal gasket is structured as a method determining the existence or nonexistence of the mis-assembly by measuring the variation of the distance between the identification mark of the metal gasket and a predetermined position; or a method determining the existence or nonexistence of the mis-assembly by illuminating a light ray on the identification mark of the metal gasket, and measuring the reflected light.

According to the mis-assembly detection method of the metal gasket, a simple distance meter device such as a relatively simple optical device, optical distance meter or ultrasonic distance meter, is only required. Also, the existence or nonexistence of the mis-assembly of the metal gasket can be determined by a very simple algorithm which compares the variation of the reflectance or the variation of the distance with a predetermined variation, so that the mis-assembly detection method can be easily automated.

According to the metal gasket of the invention, during normal assembly, all the identification marks can be seen through the penetration window, and if the assembly sequence of the lamination is incorrect, some of the identification marks cannot be seen. As a result, an assembler or observer can easily recognize an error of the assembly sequence of the lamination, so that mis-assembly can be prevented.

Also, according to the mis-assembly detection method of the metal gasket of the invention, by using a relatively simple device and the simple algorithm, the existence or nonexistence of the mis-assembly of the metal gasket can be determined, so that the mis-assembly detection method can be easily automated.

DETAILED DESCRIPTION OF PREFERRED EMBODIMENTS

Hereunder, an embodiment of a metal gasket and a mis-assembly detection method of the metal gasket according to the present invention will be described with reference to the attached drawings as an example of the metal gasket held between an exhaust manifold for an engine and a flange for an exhaust pipe. However, this invention is not limited to the embodiment and can be applied to, for example, other metal gaskets such as a gasket for an intake manifold, cylinder head gasket and so on. Incidentally, FIGS. 1-10 are schematic explanatory views in which thicknesses of plates, and sizes of sealing-target holes, beads, positioning holes, positioning projections and so on are different from actual ones and enlarged for the sake of explanation.

Figure 1:
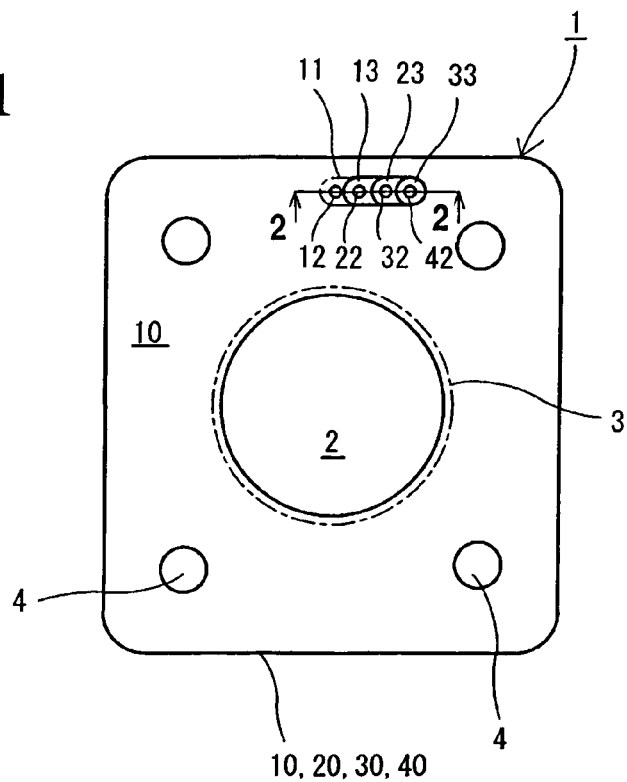
FIG. 1 is a plan view showing a metal gasket of the first embodiment of the present invention.
Figure 2:
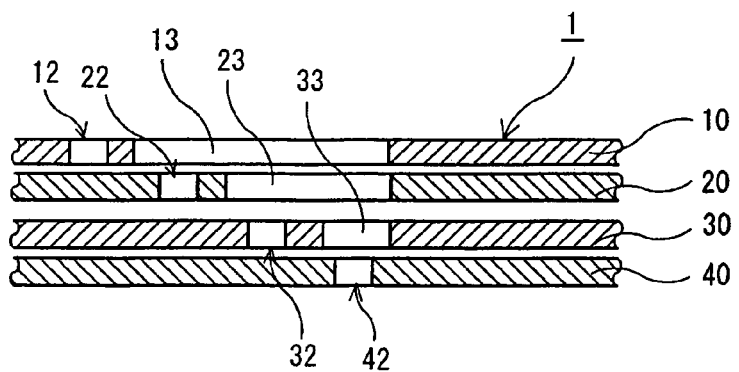
FIG. 2 is an enlarged sectional view taken along line 2-2 in FIG. 1.

First, the metal gasket of the first embodiment of the invention will be explained. As shown in FIGS. 1 and 2, the metal gasket 1 includes four sheets of metal structural plates 10, 20, 30, 40 manufactured according to the shape of the flange of the exhaust pipe. The first to fourth metal structural plates 10, 20, 30, 40 are formed by a mild steel plate, stainless annealed material (anneal material), stainless thermal refining material (spring steel plate) and so on according to demand to each metal plate.

In the first to fourth metal structural plates 10, 20, 30, 40, sealing-target holes 2 are punctured, widely known sealing means such as a full bead 3 and so on are provided around the sealing-target holes 2, and bolt holes 4 for tightening bolts are formed in four directions.

In the invention, as shown in FIGS. 3-6, the first to fourth metal plates 10, 20, 30, 40 are respectively provided with first to fourth discrimination areas 11, 21, 31, 41 which overlap during assembly. Additionally, first to fourth identification marks 12, 22, 32, 42 are respectively provided in the first to fourth discrimination areas 11, 21, 31, 41 so as not to overlap with one another during the assembly. In the first embodiment, the identification marks are punctured with the same size and same shape. Incidentally, the identification marks are not required to have the same size and shape, and each metal plate 10, 20, 30, 40 may have a particular size and shape as long as they are easily visible.

Figure 3:
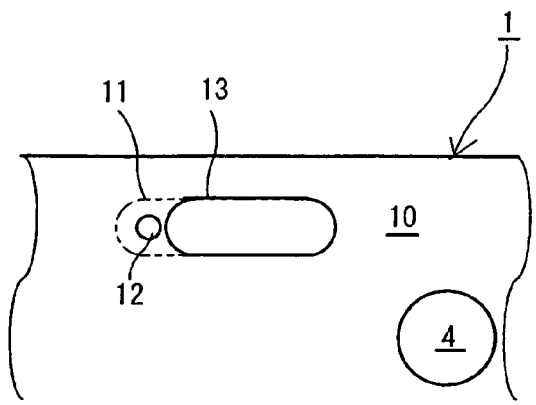
FIG. 3 is a fragmentary plan view showing the structure of a first discrimination area of a first metal plate.

Basically, as shown in FIG. 3, the first discrimination area 11 of the first metal plate 10 is provided with a first identification mark 12 and a first penetration window 13 which can see through the second to fourth identification marks 22, 32, 42 of the first second to fourth metal plates 20, 30, 40 which are lower layers of the metal plates in the assembly.

Figure 4:
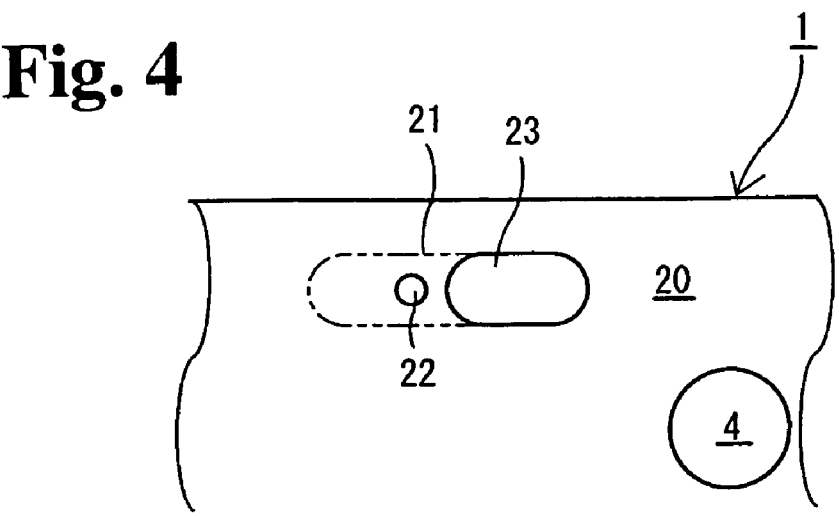
FIG. 4 is a fragmentary plan view showing the structure of a second discrimination area of a second metal plate.

Also, as shown in FIG. 4, the second discrimination area 21 of the second metal plate 20 is provided with the second identification mark 22, and a second penetration window 23. The second penetration window 23 can see the third and fourth identification marks 32, 42 of the third and fourth metal plates 30, 40 which are the lower layers of the metal plates in the assembly. However, the second penetration window 23 cannot see the first identification mark 12 of the first metal plate 10 which is the upper layer of the metal plates in the assembly.

Figure 5:
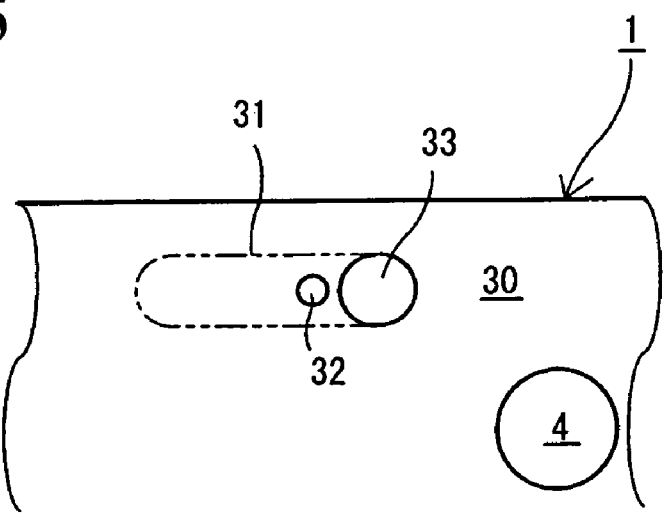
FIG. 5 is a fragmentary plan view showing the structure of a third discrimination area of a third metal plate.

Also, as shown in FIG. 5, the third discrimination area 31 of the third metal plate 30 is provided with the third identification mark 32, and a third penetration window 33. The third penetration window 33 can see through the fourth identification mark 42 of the fourth metal plate 40 which is the metal plate on the lower layer of the metal plates in the assembly. However, the third penetration window 33 cannot see the first and second identification marks 12, 22 of the first and second metal plates 10, 20 which are the upper layers of the metal plates in the assembly.

Figure 6:
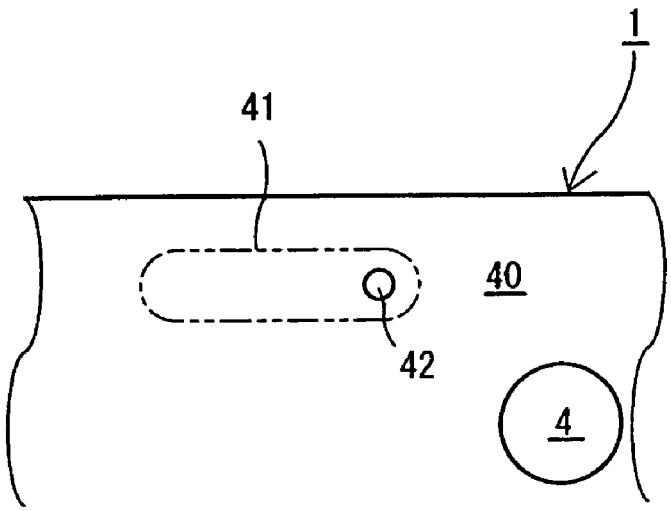
FIG. 6 is a fragmentary plan view showing the structure of a fourth discrimination area of a fourth metal plate.

Moreover, as shown in FIG. 6, the fourth discrimination area 41 of the fourth metal plate 40 is provided with the fourth identification mark 42, and made so as not to be able to see through the first to third identification marks 12, 22, 32 of the first to third metal plates 10, 20, 30 which are the upper layers of the metal plates in the assembly.

According to the structure, the identification marks 12, 22, 32, 42 are provided in the respective metal plates 10, 20, 30, 40 in a position wherein each mark does not overlap with one another, and the penetration windows 13, 23, 33 are provided in the respective metal plates 10, 20, 30 except for the metal plate 40 which is the bottom layer. The penetration windows 13, 23, 33 can see the identification marks of the metal plates on the lower side in the assembly, but cannot see the identification marks of all the metal plates on the upper side.

Figure 7:
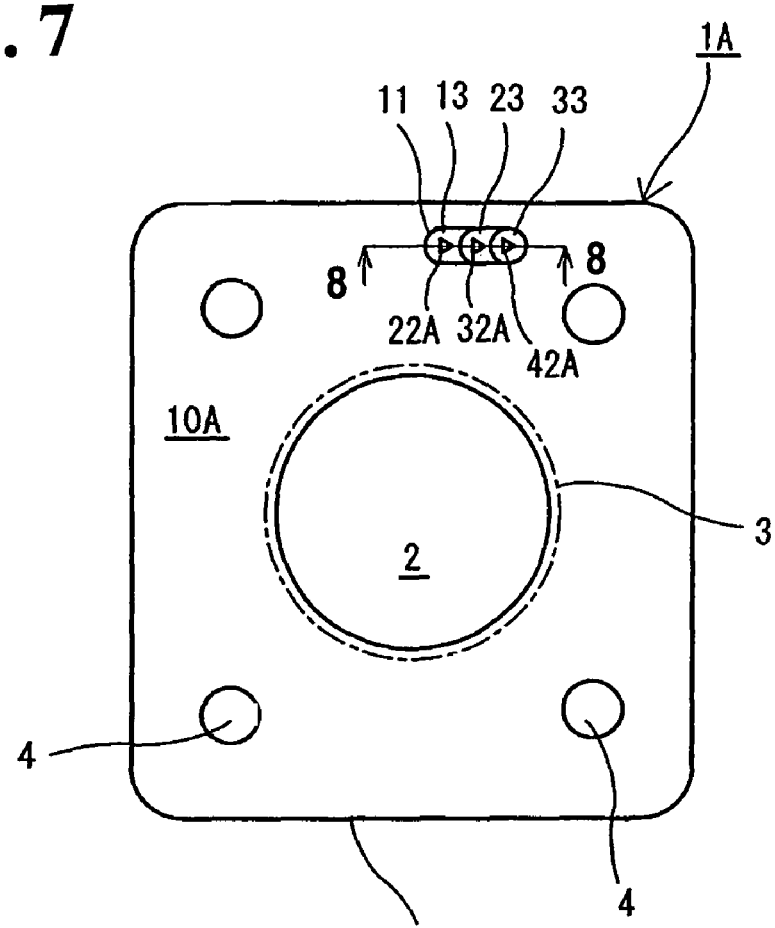
FIG. 7 is a plan view showing the metal gasket of the second embodiment of the invention.
Figure 8:
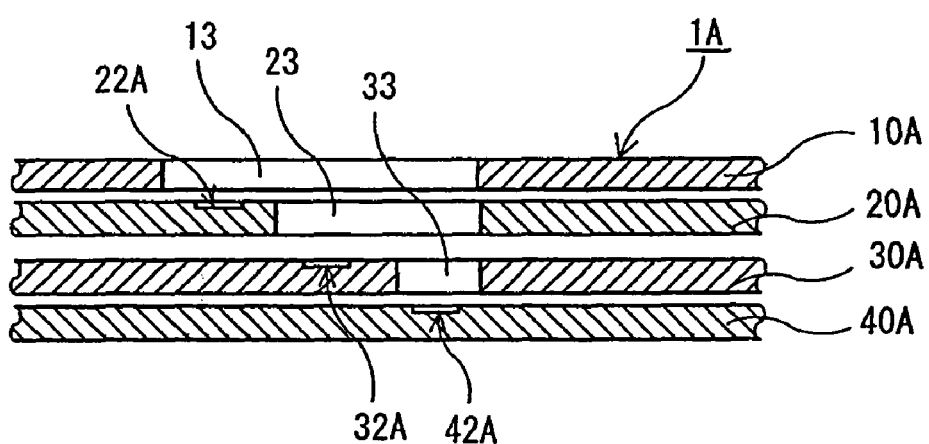
FIG. 8 is an enlarged sectional view taken along line 8-8 in FIG. 7.

Next, the metal gasket of the second embodiment of the invention will be explained. As shown in FIGS. 7 and 8, in a metal gasket 1A, only the following respect differs from the metal gasket 1 of the first embodiment, and the other structures are the same. In the first metal plate 10A on the top layer, the first identification mark is not provided and identification marks 22A, 32A, 42A are not punctured and formed with an engraved mark. According to the structure, one identification mark is reduced, so that the manufacturing time can be reduced and also discrimination becomes easier.

According to the metal gaskets 1, 1A with the above-mentioned structure, during normal assembly, all of the identification marks 22, 32, 42, 22A, 32A, 42A can be seen through the penetration windows 13, 23, 33. However, if the assembly sequence of the lamination is incorrect, some of the identification marks cannot be seen. As a result, an assembler or observer can easily recognize an error, so that the mis-assembly can be prevented.

Moreover, when the identification marks are provided only on the surface of the upper side of each metal plate, the mis-assembly wherein the front and back sides are incorrect can be easily recognized. Alternatively, in order to show the direction of each metal plate during the assembly, identification marks such as a triangle shape or arrow for a sense of direction can be formed, so that the error of an assembly direction can be recognized. Also, if the identification marks are formed by numbers, a portion which is assembled incorrectly can be recognized, so that it is useful. Incidentally, when the mis-assembly is recognized, the front and back sides and assembly sequence of the lamination of the respective metal plates are accurately prepared, and the metal plates are assembled again, or once they are removed from the manufacturing line, and once again, the correct assembly sequence of the lamination is prepared and returned to the manufacturing line.

Figure 9:
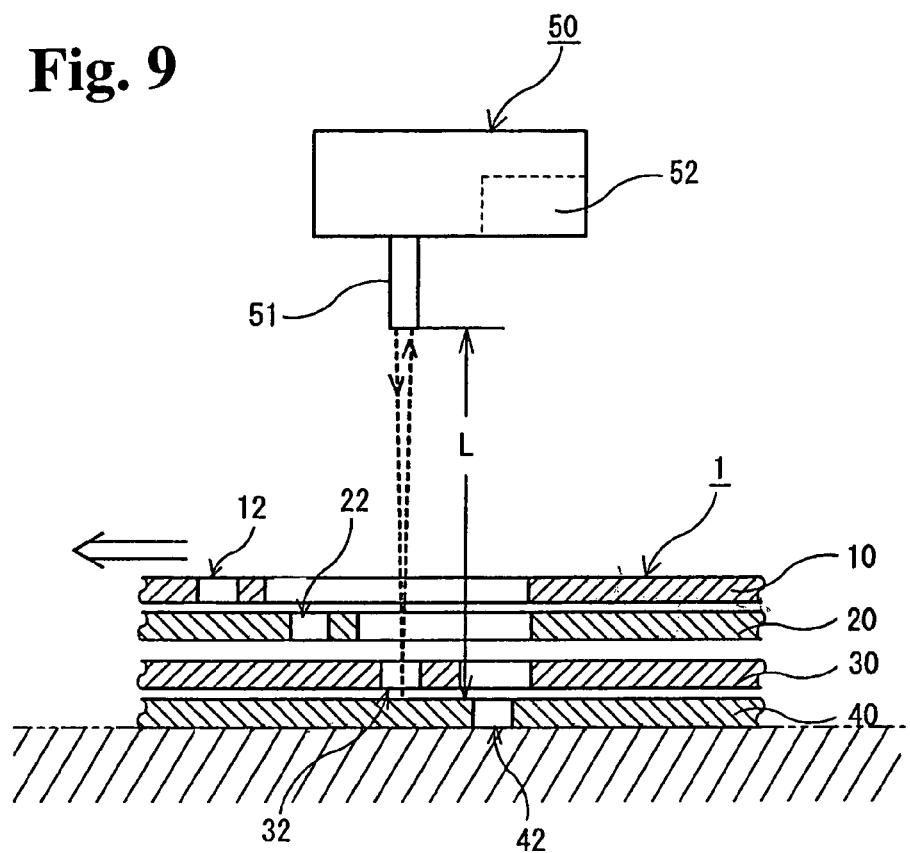
FIG. 9 is an explanatory view of a mis-assembly detection method of the metal gasket of the first embodiment of the invention.

Next, the mis-assembly detection method of the metal gasket of the first embodiment according to the invention will be explained. As shown in FIG. 9, the mis-assembly detection method of the metal gasket is a method detecting the mis-assembly by variations of distances L to the identification marks 12, 22, 32, 42 of the metal gasket 1, and a distance meter 51 and a discrimination device 52 are used for a detection device 50. The distance meter 51 may be a contact type. However, a noncontact type such as an ultrasonic distance meter or a laser meter is preferred because it is easy to use.

In this method, the distances L between the positions of the identification marks 12, 22, 32, 42 of the metal gasket 1 and a predetermined standard position (for example, the position of the distance meter and the like) are measured sequentially by transferring the distance meter 51 or the metal gasket 1, and then the existence or nonexistence of the mis-assembly is determined.

In the algorithm wherein the existence or nonexistence of the mis-assembly is determined by a measured value, when the variation of the distances L has the same pattern as the variation of the distances L set in advance, the algorithm determines that there is no mis-assembly, and when the variation of the distances L has a different pattern, the algorithm determines that there is a mis-assembly.

Figure 10:
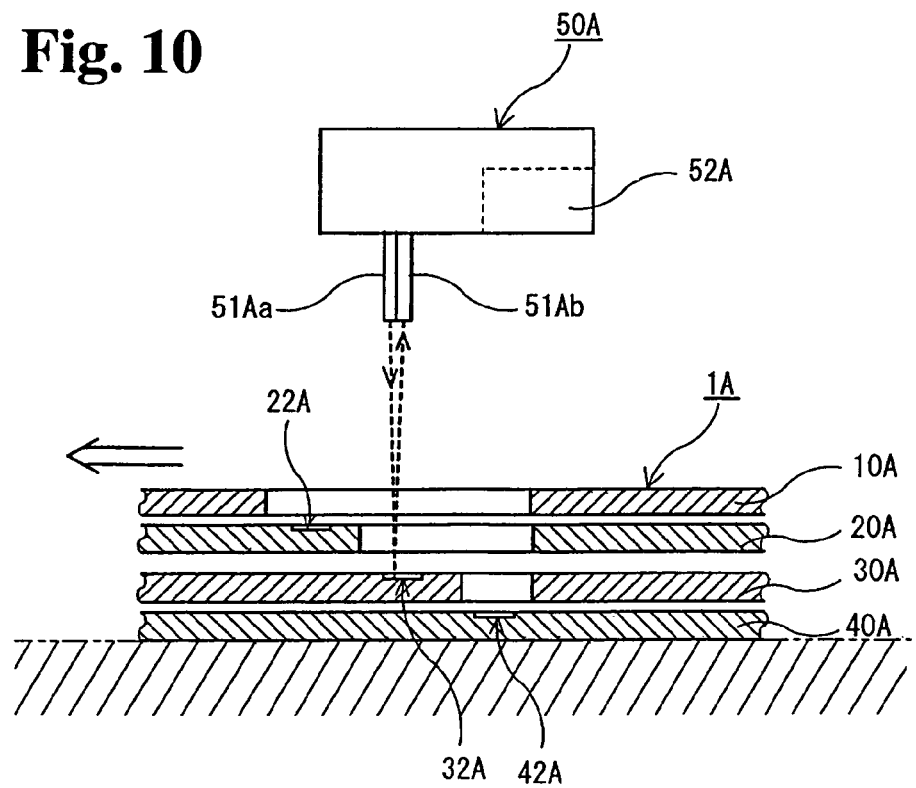
FIG. 10 is an explanatory view of the mis-assembly detection method of the metal gasket of the second embodiment of the invention.

Next, the mis-assembly detection method of the metal gasket of the second embodiment according to the invention will be explained. As shown in FIG. 10, in the mis-assembly detection method of the metal gasket, the reflectance of the identification marks 22A, 32A, 42A of the metal gasket 1A is changed from the reflectance of the peripheral parts, and the detection device 50A is provided with a light source 51Aa illuminating a light ray; a light detection device 51Ab measures a reflected light; and a determination device 52A determines the existence or nonexistence of the mis-assembly by the measured value of the reflected light. The reflected light is measured at the light detection device 51Ab by transferring the light source 51Aa and the light detection device 51Ab to the identification marks 22A, 32A, 42A of the metal gasket 1A, or illuminating the light ray sequentially by transferring the metal gasket 1A. The measured value is sent to the determination device 52A, so that the existence or nonexistence of the mis-assembly is determined.

In the algorithm determining the existence or nonexistence of the mis-assembly by the measured value, when the number of the reflectance of the illuminated lights is the number of the reflectance of the identification marks 22A, 32A, 42A, the algorithm determines that there is no mis-assembly, and when the numbers are smaller, the algorithm determines that there is a mis-assembly.

According to the mis-assembly detection method of the metal gasket, due to the usage of the distance meter device such as an optical distance meter or an ultrasonic distance meter; or a relatively simple optical device, the existence or nonexistence of the mis-assembly of the metal gasket can be determined by the very simple algorithm, so that the mis-assembly detection method can be easily automated.

The disclosure of Japanese Patent Application No. 2007-000575, filed on Jan. 5, 2007, is incorporated in the application.

While the invention has been explained with reference to the specific embodiments of the invention, the explanation is illustrative and the invention is limited only by the appended claims.

What is claimed is:

1. A metal gasket comprising:
   at least three metal plates including first, second and third metal plates laminated in this order from a top to form the metal gasket,
   identification marks provided at said second and third metal plates in a position not to overlap with one another in a lamination direction, and
   penetration windows, one penetration window being formed in each of the first and second metal plates, said penetration windows being arranged to see the identification mark therethrough located lower than the metal plate where the penetration window is formed,
   wherein the one penetration window formed in the second metal plate is arranged above the third metal plate such that the identification mark of the third metal plate is seen through the one penetration window of the second metal plate, and
   the one penetration window formed in the first metal plate is arranged above the second metal plate such that the identification mark and the penetration window of the second metal plate and the identification mark of the third metal plate are seen through the one penetration window of the first metal plate.

2. A metal gasket according to claim 1, wherein all the metal plates include the identification marks.

3. A metal gasket according to claim 1, wherein the first metal please plate includes the penetration window without the identification mark, and the third metal plate includes the identification mark without the penetration window.

4. A metal gasket according to any one of claims 1, wherein the identification mark is a dent.

5. A metal gasket according to claims 1, wherein the identification mark is a through hole.

6. A metal gasket according to claim 1, wherein the second metal plate includes only one identification mark and only one penetration window adjacent to the only one identification mark.

7. A metal gasket according to claim 6, wherein the one penetration window of the first metal plate is greater in size than the one penetration window of the second metal plate.

8. A metal gasket according to claim 7, further comprising a fourth metal plate laminated on the first metal plate, said fourth metal plate having a penetration window and being arranged above the first metal plate such that the penetration windows and identification marks under the fourth metal plate are seen through the penetration window of the fourth metal plate.

9. A mis-assembly detection method of a metal gasket, comprising:

preparing the metal gasket according to claim 1,
measuring variation of a distance between the identification marks of the metal gasket and a predetermined position, and
determining existence or nonexistence of the mis-assembly by the variation of the distance.

10. A mis-assembly detection method according to claim 9, wherein in case the variation of the distance is constant, it is determined that the mis-assembly does not exist.

11. A mis-assembly detection method of the metal gasket, comprising:
preparing the metal gasket according to claim 1,
illuminating a light on the identification marks of the metal gasket, and
measuring a reflected light to determine existence or non-existence of the mis-assembly.

12. A mis-assembly detection method according to claim 11, wherein in case a number of reflection of lights at the identification marks is identical to a number of the identification marks, it is determined that the mis-assembly does not exist.

* * * * *

UNITED STATES PATENT AND TRADEMARK OFFICE
CERTIFICATE OF CORRECTION

| | | |
|---|---|---|
| PATENT NO. | : 7,914,008 B2 | Page 1 of 1 |
| APPLICATION NO. | : 12/003979 | |
| DATED | : March 29, 2011 | |
| INVENTOR(S) | : Toshihiro Imai | |

It is certified that error appears in the above-identified patent and that said Letters Patent is hereby corrected as shown below:

Please change column 4, line 16, "first second" to -- second --

Please change column 6, line 45, "please plate" to -- plate --

Signed and Sealed this
Sixteenth Day of August, 2011

David J. Kappos
*Director of the United States Patent and Trademark Office*